United States Patent
Kitano

(10) Patent No.: US 9,571,385 B2
(45) Date of Patent: Feb. 14, 2017

(54) INFORMATION PROCESSING APPARATUS, INFORMATION PROCESSING SYSTEM, AND PROGRAM

(71) Applicant: SONY CORPORATION, Tokyo (JP)

(72) Inventor: Hiroaki Kitano, Saitama (JP)

(73) Assignee: Sony Corporation, Tokyo (JP)

( * ) Notice: Subject to any disclaimer, the term of this patent is extended or adjusted under 35 U.S.C. 154(b) by 420 days.

(21) Appl. No.: 13/760,182

(22) Filed: Feb. 6, 2013

(65) Prior Publication Data

US 2013/0262699 A1 Oct. 3, 2013

(30) Foreign Application Priority Data

Mar. 28, 2012 (JP) .................. 2012-073429

(51) Int. Cl.
*H04L 12/725* (2013.01)
*H04L 29/08* (2006.01)
*H04W 4/20* (2009.01)

(52) U.S. Cl.
CPC ............ *H04L 45/308* (2013.01); *H04L 67/00* (2013.01); *H04W 4/206* (2013.01)

(58) Field of Classification Search
CPC .... G06Q 50/01; G06Q 30/06; G06Q 30/0601; G06F 21/10; G06F 17/30017; G06F 21/60; G06F 17/30053; G06F 3/0482; H04L 2463/101; H04L 63/20; H04L 65/4084; H04L 43/08; H04L 51/32; H04L 67/06; H04L 67/104; H04L 67/22; H04N 21/6175; H04N 21/812; H04N 21/4825; H04N 21/25875; H04N 21/8113; H04N 21/26258; H04N 21/44222; H04W 8/24; Y10S 705/902

See application file for complete search history.

(56) References Cited

U.S. PATENT DOCUMENTS

| | | | |
|---|---|---|---|
| 6,314,409 B2 * | 11/2001 | Schneck et al. ................ 705/54 |
| 6,571,279 B1 * | 5/2003 | Herz et al. .................... 709/217 |
| 7,420,956 B2 * | 9/2008 | Karaoguz et al. ............ 370/338 |
| 7,987,280 B1 * | 7/2011 | Putnam ............... H04L 65/1076 704/219 |
| 2006/0107046 A1 * | 5/2006 | Raley ...................... G06F 21/10 713/168 |
| 2006/0224513 A1 * | 10/2006 | Kawamoto ............ G06F 21/10 705/50 |
| 2006/0235956 A1 * | 10/2006 | Kawaguchi ............ G06F 21/10 709/223 |
| 2006/0259957 A1 * | 11/2006 | Tam et al. ........................ 726/3 |
| 2007/0106551 A1 * | 5/2007 | McGucken ............ G06Q 30/02 705/7.29 |

(Continued)

*Primary Examiner* — Sargon Nano
(74) *Attorney, Agent, or Firm* — Paratus Law Group, PLLC

(57) ABSTRACT

There is provided an information processing apparatus including a distribution information acquisition section which acquires distribution information indicating that content-related data is distributed from a first user to a second user through a social network to which the first user and the second user belong, and a route information generation section which generates route information based on the distribution information, the route information indicating a route through which the content-related data is distributed among users belonging to the social network.

16 Claims, 15 Drawing Sheets

(56) References Cited

U.S. PATENT DOCUMENTS

| | | | |
|---|---|---|---|
| 2008/0235142 A1* | 9/2008 | Gonze | G06F 21/10 705/59 |
| 2008/0235588 A1* | 9/2008 | Gonze | G11B 27/034 715/719 |
| 2009/0058822 A1* | 3/2009 | Chaudhri | 345/173 |
| 2009/0099919 A1* | 4/2009 | Schultheiss | G06Q 10/00 705/14.1 |
| 2010/0235762 A1* | 9/2010 | Laiho | G06F 17/30893 715/753 |
| 2011/0004517 A1* | 1/2011 | Soto | G06Q 30/02 705/14.51 |
| 2011/0202430 A1* | 8/2011 | Narayanan et al. | 705/27.1 |
| 2012/0109779 A1* | 5/2012 | Shin et al. | 705/26.8 |
| 2013/0031162 A1* | 1/2013 | Willis | H04L 67/02 709/203 |
| 2013/0091214 A1* | 4/2013 | Kellerman et al. | 709/204 |
| 2013/0095864 A1* | 4/2013 | Marovets | 455/466 |
| 2013/0110929 A1* | 5/2013 | Gundotra | H04L 65/4084 709/204 |
| 2013/0218961 A1* | 8/2013 | Ho | G06Q 30/02 709/204 |
| 2014/0006556 A1* | 1/2014 | Shapiro et al. | 709/217 |
| 2014/0012666 A1* | 1/2014 | Lohier et al. | 705/14.49 |
| 2014/0181211 A1* | 6/2014 | Narayanan et al. | 709/204 |
| 2014/0245191 A1* | 8/2014 | Serena | 715/753 |

\* cited by examiner

FIG. 6

| | USER NAME | DISTRIBUTION SOURCE | PURCHASE? |
|---|---|---|---|
| REC_1 | USER B | USER A | YES |
| REC_2 | USER C | USER B | NO |
| REC_3 | USER D | USER A | NO |
| REC_4 | USER F | USER C | YES |
| REC_5 | USER G | USER C | YES |

FIG. 10

| | USER NAME | DISTRIBUTION SOURCE | REPRODUCTION? | PURCHASE? |
|---|---|---|---|---|
| REC_11 | USER A | - | NO | YES |
| REC_12 | USER B | USER A | YES | YES |
| REC_13 | USER C | USER B | NO | NO |

USER C:SP10/DP=0
USER D:SP0/DP=40 
USER I:SP20/DP=0

INFORMATION PROCESSING APPARATUS, INFORMATION PROCESSING SYSTEM, AND PROGRAM

BACKGROUND

The present disclosure relates to an information processing apparatus, an information processing system, and a program.

Pieces of content used by a computer are extremely easily distributed through a communication network, a removable recording medium, or the like because data which are entities of the content can easily be copied. Such high distributability of the content draws attention as so-called "superdistribution" or the like from an early stage in the history of the content. Various techniques have been proposed for how rights of works distributed particularly as content are protected, as described in JP H6-95302B, for example.

Meanwhile, techniques for providing network services have significantly advanced in recent years, and various pieces of information are distributed through networks. For example, JP 4085284B describes a technique by which a play list for playing back content such as musical compositions is shared by users and content in the shared play list is acquired through a network for playing back the content. As described above, it is currently general that not only data which is a content entity but also various pieces of data related to the content are distributed through a network.

SUMMARY

However, there is still room for improvement in a technique of managing distributed content or information related thereto. For example, in the technique as described in the aforementioned JP H6-95302B and an improved technique therefor, there is a need for user input of some information, association with a particular device owned by a user, or the like. Accordingly, both convenience for users using content and the right protection have not been fully achieved. In addition, as for the technique of managing various pieces of content-related information as described in JP 4085284B, it is difficult to say that a full-fledged technique is proposed.

In light of the foregoing, it is desirable to provide an information processing apparatus, an information processing system, and a program, which are novel and improved, and which can more efficiently manage distribution of content or information related thereto on a network.

According to an embodiment of the present disclosure, there is provided an information processing apparatus including a distribution information acquisition section which acquires distribution information indicating that content-related data is distributed from a first user to a second user through a social network to which the first user and the second user belong, and a route information generation section which generates route information based on the distribution information, the route information indicating a route through which the content-related data is distributed among users belonging to the social network.

Further, according to an embodiment of the present disclosure, there is provided an information processing system which provides a social network to which a first user and a second user belong, the information processing system including a terminal device which acquires content-related data associated with the second user and distributed from the first user, and a server device including a distribution information acquisition section which acquires distribution information through the social network, the distribution information indicating that the terminal device acquires the content-related data, and a route information generation section which generates route information based on the distribution information, the route information indicating a route through which the content-related data is distributed among users belonging to the social network.

Further, according to an embodiment of the present disclosure, there is provided a program for causing a computer to implement a function of acquiring distribution information through a social network to which a first user and a second user belong, the distribution information indicating that content-related data is distributed from the first user to the second user, and a function of generating route information based on the distribution information, the route information indicating a route through which the content-related data is distributed among users belonging to the social network.

The route of the distribution of the content-related data (the content or the information related thereto) among the users can be identified by acquiring the information on the distribution of the content-related data as a relationship between the first user who is a distribution source and the second user who is a distribution destination. Utilization of the route information makes it possible to more efficiently manage the distribution of the content-related data.

According to the embodiments of the present disclosure described above, distribution of content or information related thereto on a network can be managed more efficiently.

BRIEF DESCRIPTION OF THE DRAWINGS

FIG. 6 is a table illustrating an example of route information generated in the first embodiment of the present disclosure;

FIG. 10 is a table illustrating an example of route information generated in the second embodiment of the present disclosure;

DETAILED DESCRIPTION OF THE EMBODIMENTS

Figure 1:
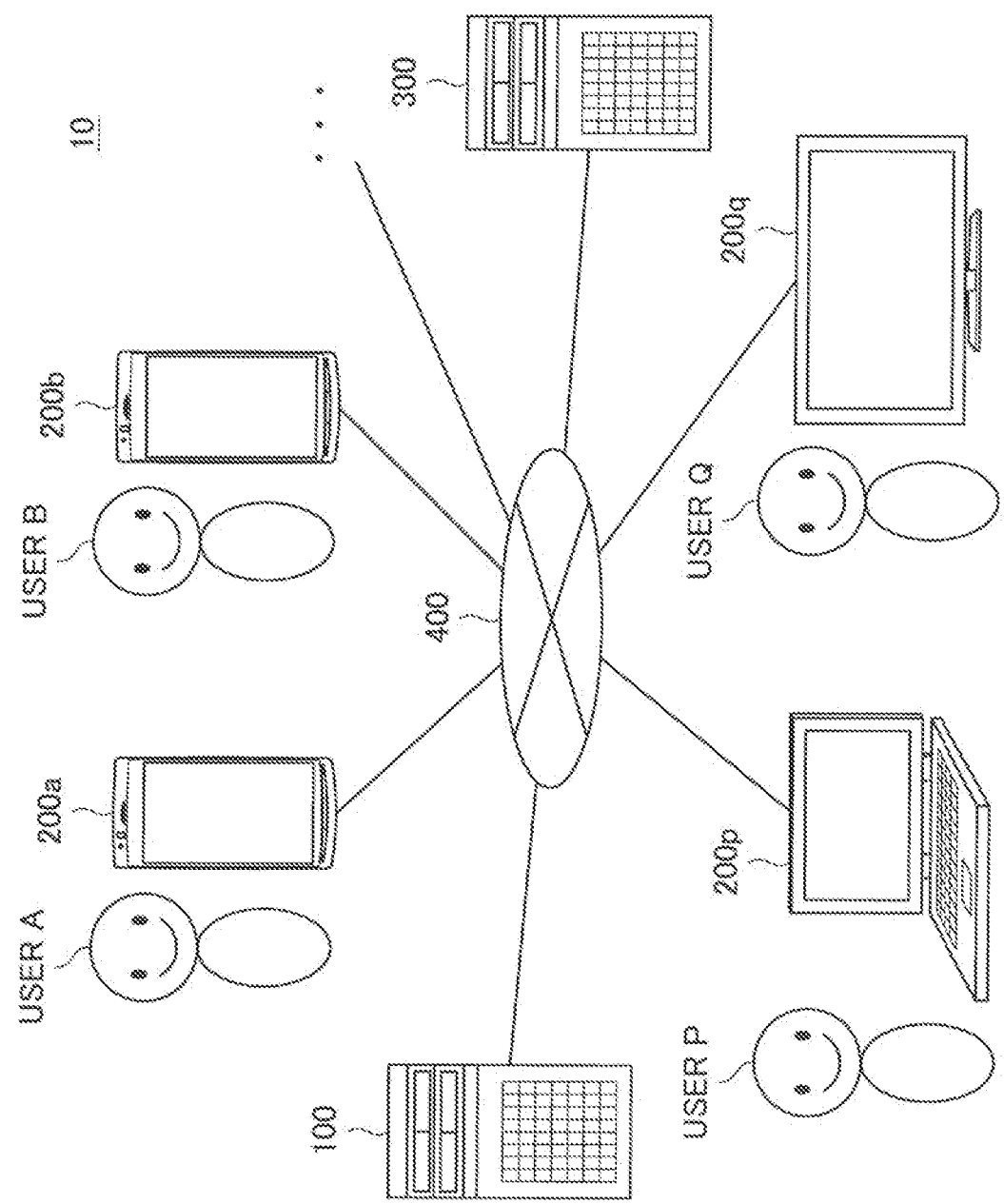
FIG. 1 is a diagram illustrating a configuration of a system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the descriptions are given in the following order.
1. First embodiment
1-1. System configuration
1-2. Content-related data distribution example
1-3. User interface examples
1-4. Acquired information example
1-5. Route information example
1-6. Modification
2. Second embodiment
2-1. Content-related data distribution example
2-2. Acquired information example
2-3. Route information example
2-4. Route information utilization example
2-5. Modification
3. Device configuration
3-1. Functional configuration
3-2. Hardware configuration
4. Supplement (1. First Embodiment)

Firstly, a description is given of a first embodiment of the present disclosure. In the present embodiment, content-related data is URL information. The URL information is distributed in a social network to which users belong.

(1-1. System Configuration)

FIG. 1 shows an information processing system 10 in which a server device 100 and terminal devices 200 are connected through a network 400. The network 400 includes both a communication network such as the Internet and network services such as social network services provided on the communication network. Accordingly, in the present specification, a term "a social network" does not mean a so-called social scientific network (established not through the communication network) but a network realized as a service by a system on the communication network. Users (a user A, a user B, a user P, and a user Q) access the network 400 by using the respective terminal devices 200. Note that the terminal devices 200 are associated with the users thereof, respectively. As illustrated FIG. 2, more other users may access the network 400 by using terminal devices 200 thereof.

The terminal devices 200 include various devices having an information processing function and a communication function, such as smartphones 200a and 200b respectively used by the users A and B, a PC (a personal computer) 200p used by the user P, and a television device 200q used by the user Q. Each of these terminal devices 200 may be used by the corresponding user for processing related to content. For example, the terminal device 200 may be used by the user for reproducing a content entity such as a tune or video, or may be used by the user for browsing a web page for acquiring information related to content.

In addition, the server device is connected to the network 400. The server device 100 acquires information indicating distribution of content-related data among the users and generates distribution route information of the content-related data by using the information, as will be described later. Note that the server device 100 is illustrated as a single image processing apparatus, but is not limited to the example. For example, the server device 100 may be realized by using resources of a plurality of devices connected through the communication network in conjunction with each other.

Further, a content providing server device 300 may be connected to the network 400. The content providing server device 300 is used by a content provider such as an enterprise selling content, and plays a different role from that of the terminal devices 200 in the network 400, as will be described later. The content providing server device 300 is not limited to a single device as illustrated, either, and may be realized by using resources of a plurality of devices connected through the communication network in conjunction with each other (1-2. Content-Related Data Distribution Example)

Figure 2:
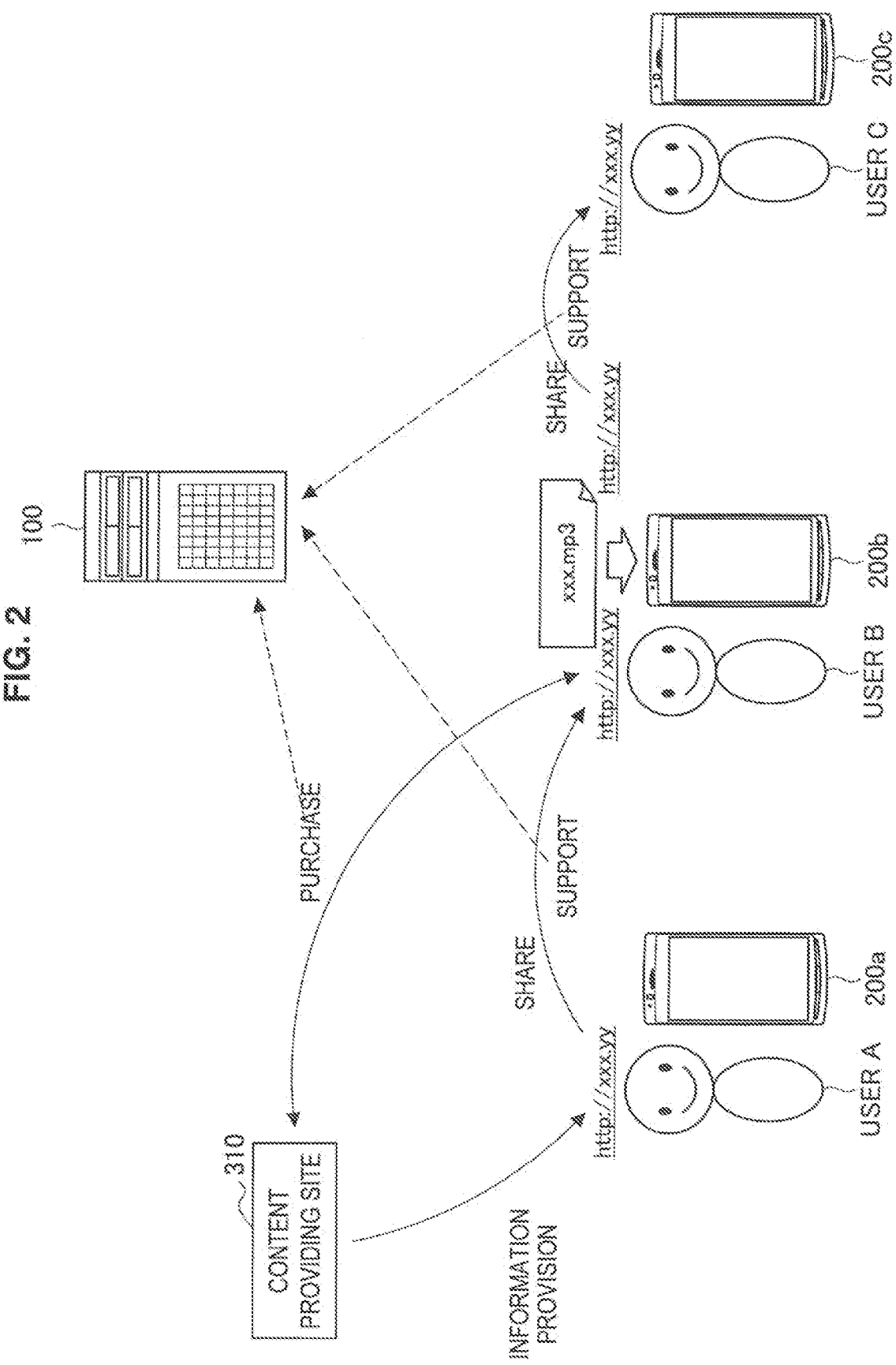
FIG. 2 is a diagram illustrating an example of distribution of content-related data in the first embodiment of the present disclosure.

FIG. 2 shows an example of distribution of content-related data in the present embodiment. In the present embodiment, the content-related data is URL (Uniform Resource Locator) information for accessing a content providing site 310 managed by the content providing server device 300, for example. A user accessing the content providing site 310 by using URL (http://xxx.yy) can obtain a sound file (xxx.mp3) of a tune by purchasing the sound file at the URL, the sound file being a content entity. As described above, the content-related data may be information indicating how content is obtained.

In the illustrated example, the user A is firstly provided with URL information for accessing the content providing site 310. The URL information is provided as information to the user A by the content provider. That is, the content provider designates the user A as a root distributor of the URL information which is the content-related data.

The user A provided with the information shares the URL information with the user B who is a friend of the user A by using a social network service provided in the network 400. When having a favorable impression on the shared URL information, the user B voices support for the shared URL information. Further, the user B may share the URL information with a user C who is a friend of the user B. When having a favorable impression on the shared URL information, the user C also voices support for the shared URL information.

Further, in the illustrated example, the user B accesses the content providing site 310 by using the shared URL information and purchases the content entity (xxx.mp3). It goes without saying that any of the users A and C sharing the URL information can purchase the content entity by accessing the content providing site 310 in the same way.

(1-3. User Interface Examples)

Hereinbelow, examples of user interfaces (screens) of the social network service will be described with reference to FIGS. 3 to 5. The user interfaces can be presented to respective users when the content-related data is distributed as in FIG. 2 described above.

Figure 3:
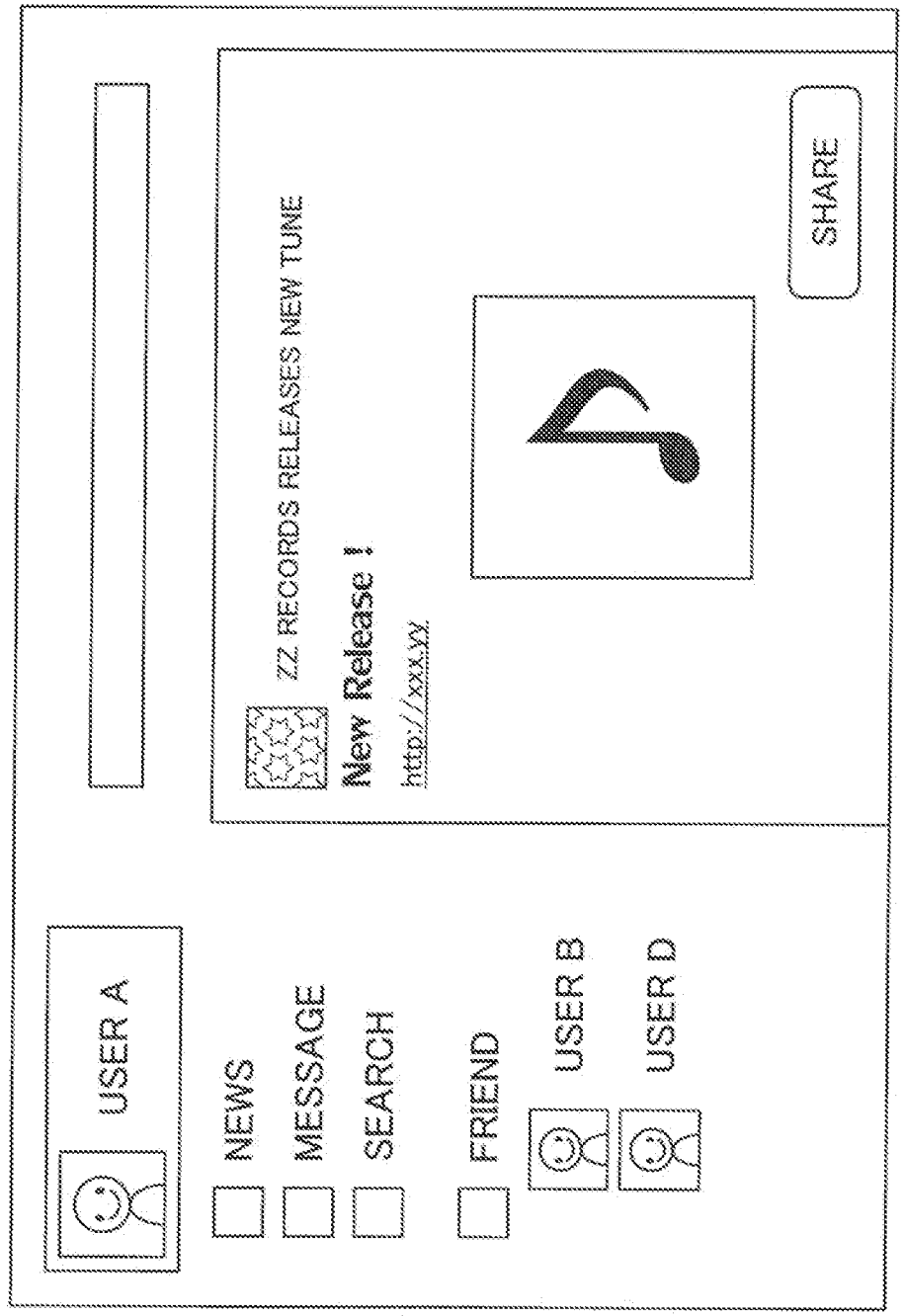
FIG. 3 is a diagram illustrating an example of a user interface which can be presented to a user in the first embodiment of the present disclosure.

FIG. 3 shows the example of one of the user interfaces which is presented to the user A provided with the information from the content provider (ZZ RECORDS). In the illustrated example, a message from ZZ RECORDS indicating that a new tune is released is displayed as a news feed. The message is delivered to only users designated as root distributors of the URL information by ZZ RECORDS. The message includes the URL information (http://xxx.yy) for accessing a shopping page for purchasing a tune (a content entity).

The user A viewing the news feed can share the URL information with other users by pressing a "SHARE" button. Specifically, the other users are the user B and a user D who are friends of the user A. Note that when the user A thinks, for example, that the tune does not meet preferences of the friends or is not worthy of his/her recommendable tune, the user A might not share the URL information.

Figure 4:
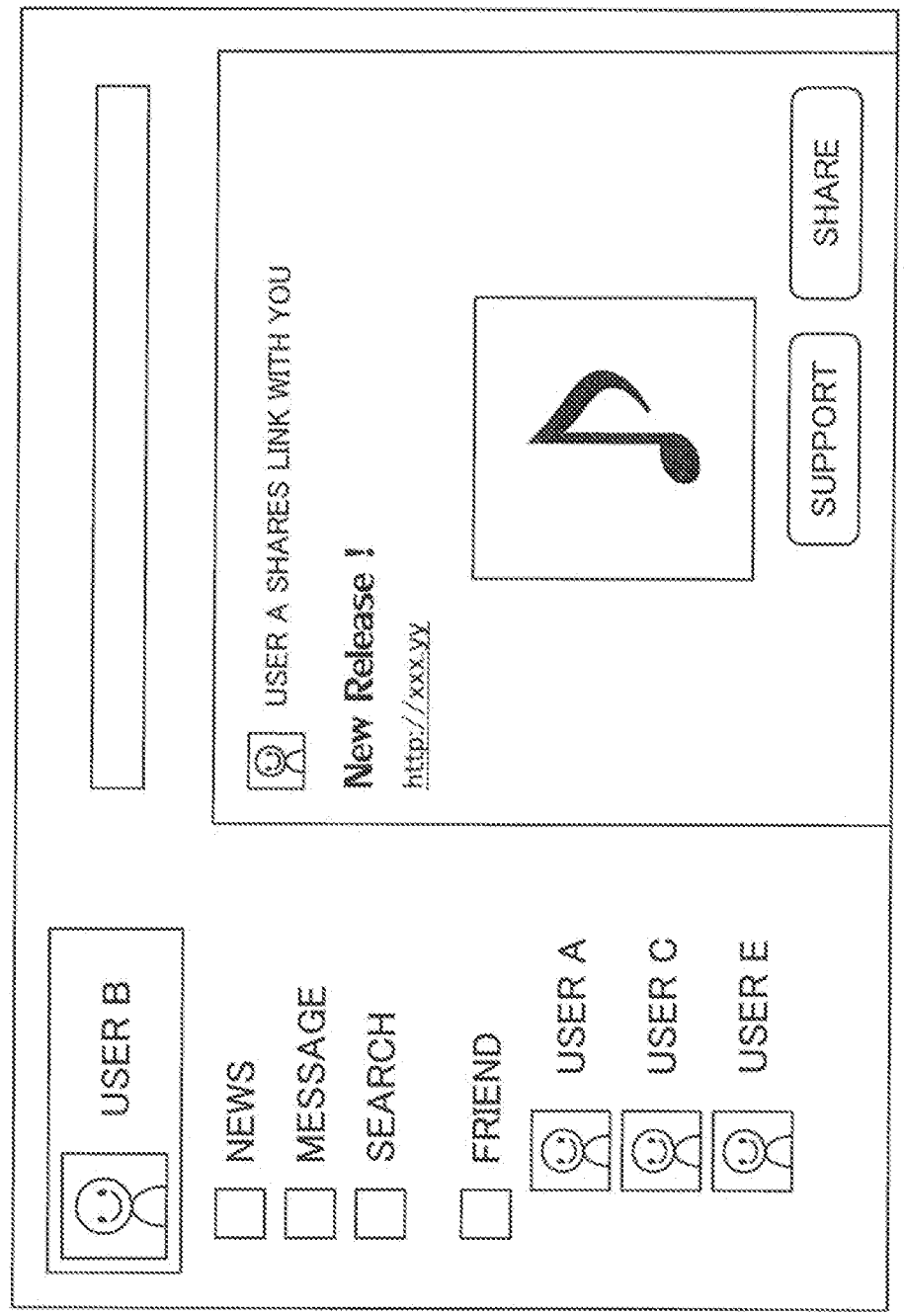
FIG. 4 is a diagram illustrating an example of a user interface which can be presented to a user in the first embodiment of the present disclosure.

FIG. 4 shows the example of one of the user interfaces which is presented to the user B with whom the user A shares the URL information. In the illustrated example, the news feed indicating that the user A shares a link (the URL information) is displayed. The news feed is displayed on a user interface of each of users (the users B and D who are friends of the user A in this example) allowed to view the information shared by the user A.

The user B viewing the news feed can express support for the URL information by pressing a "SUPPORT" button. In addition, the user B can share the URL information with still other users by pressing the "SHARE" button. Specifically, the still other users are the user C and a user E who are friends of the user B (the user B already shares the URL information with the user A). It goes without saying that when the user B thinks, for example, that the tune does not meet preferences of the friends or is not worthy of his/her recommendable tune, the user B might not share the URL information, either.

Figure 5:
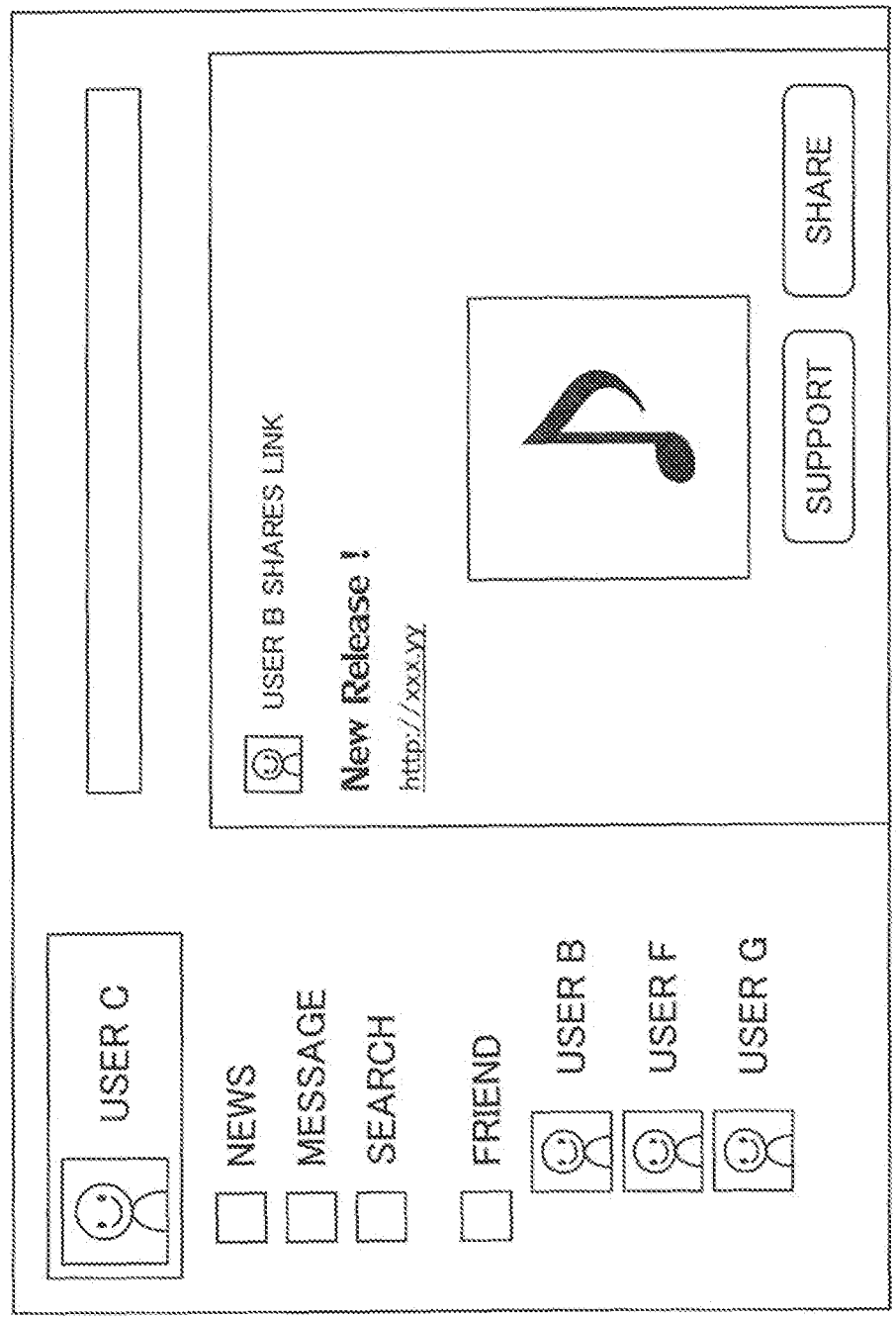
FIG. 5 is a diagram illustrating an example of a user interface which can be presented to a user in the first embodiment of the present disclosure.

FIG. 5 shows the example of one of the user interfaces which is presented to the user C with whom the user B shares the URL information. In the illustrated example, the same news feed as for the user B is displayed to the user C (but a sender is not the user A but the user B). In addition, the user C can express support for the URL information by pressing the "SUPPORT" button and share the URL information with still other users (a user F and a user G) by using the "SHARE" button.

(1-4. Acquired Information Example)

Here, with reference to FIG. 2 again, a description is given of the information acquired by the server device 100 with respect to the content-related data in the present embodiment. The server device 100 acquires distribution information from activities in the network 400, the distribution information indicating that the content-related data (the URL information) is distributed.

In the illustrated example, the activities in the network 400 are "SUPPORT" of the user B for the URL information shared by the user A and "SUPPORT" of the user C for the URL information shared by the user B. Each of these activities shows that the URL information is distributed from a certain user to another user.

Here, since a distribution source (the user A) and a distribution destination (the user B) are identified based on the activities of "SUPPORT", i.e., by pressing the "SUPPORT" button, the distribution of the URL information is considered to be established based on the activity. For example, at the time point when the user A shares the URL information with the friends by pressing the "SHARE" button, it has not been identified yet who actually has an opportunity to access the URL information among the friends (the users B and D sharing the URL information).

In other words. "SUPPORT" is dealt with as an activity indicating "DISTRIBUTION" only conveniently in the present embodiment, and an affirmative response expressed by "SUPPORT" is not necessarily a condition of "DISTRIBUTION". Accordingly, in the example in FIG. 4, for example, even though the user B does not press the "SUPPORT" button, information indicating that the user B presses the "SHARE" button or accesses the content providing site 310 may be dealt with as information indicating that the URL information is distributed from the user A to the user B. Alternatively, the distribution of the URL information to the friends (the users B and D) allowed to view the URL information may be considered to be established at the time point when the user A presses the "SHARE" button to share the URL information.

In addition, in the present embodiment, the server device 100 may acquire license information indicating that content (tune) corresponding to the content-related data (the URL information) is purchased. Note that it can be said that the purchasing corresponds to obtaining a license of the content by paying for the content. In the illustrated example, the server device 100 acquires information indicating that the user B accesses the content providing site 310 according to the URL information to purchase the content.

In this way, the route information indicating a route of the distribution of the content-related data (the URL information) among users belonging to the network 400 is generated based on the information acquired by the server device 100.

(1-5. Route Information Example)

FIG. 6 shows an example of the route information generated in the present embodiment. For example, in the aforementioned example, when the distribution information indicating that the URL information is distributed from the user A to the user B is acquired, a record REC_1 is added to the route information. The record REC_1 has fields for identifying a user name (the user B) and a distribution source (the user A).

Further, a purchase state flag showing whether or not the user B purchases the content (the tune) may be added to the record REC_1. When the distribution information is acquired to generate the record REC_1, the purchase state flag is set to "NO", which indicates that the user B has not purchased the content. Thereafter, when information indicating that the user B purchases the content at the content providing site 310 is acquired as license information, the purchase state flag of the record REC_1 associated with the user B is updated to "YES", that is, a flag indicating that the user B purchases the content.

Subsequently, when distribution information indicating that the URL information is distributed from the user B to the user C is acquired, a record REC_2 is added to the route information in the same say. The record REC_2 identifies the user C and the user B as the user name and the distribution source, respectively. In addition, the purchase state flag of the record REC_2 is set to "NO".

In the illustrated example of the distribution information, records REC_3 to REC_5 are generated which indicate the distribution of the URL information to the user D, the user F, and the user G, in addition to the records REC_1 and REC_2 indicating the distribution of the URL information shown in the aforementioned example in FIG. 2. The record REC_3 shows that not only the user B but also the user D supports the URL information shared by the user A as shown in FIG. 3. In addition, the records REC_4 and REC_5 show that, in the aforementioned example in FIG. 2, further the user C shares the URL information and that the user F and the user G who are friends of the user C share the URL information. Further, the users F and G access the content providing site 310 to purchase the content.

Figure 7:
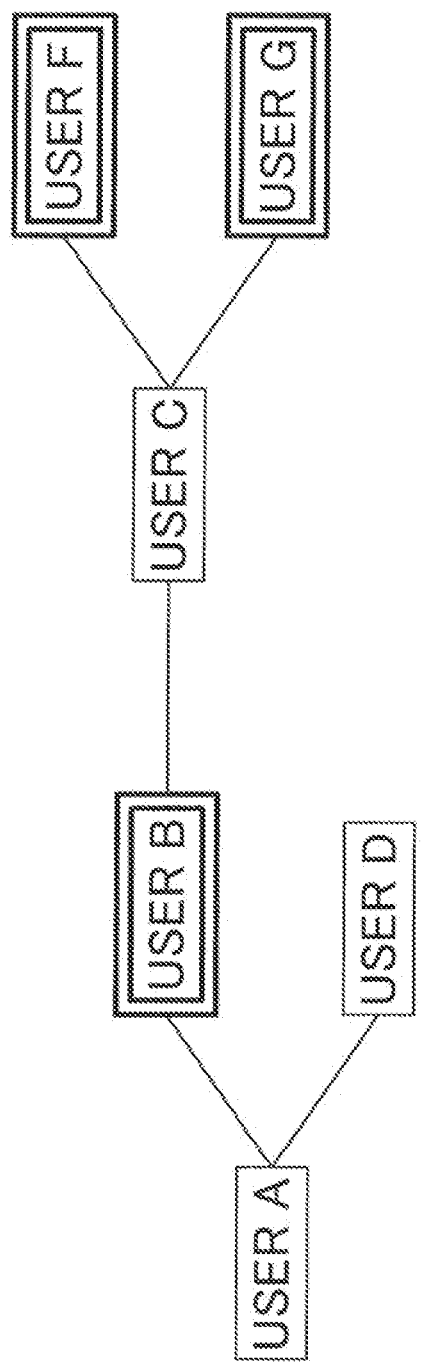
FIG. 7 is a diagram illustrating an example of visually expressing the route information illustrated in FIG. 6.

FIG. 7 shows the route information in FIG. 6 which is visually expressed in a tree structure. In this way, the route information can be expressed in a tree structure including the root distributor as a root node and users receiving the distributed content-related data as nodes.

Such route information makes it possible to easily find a route through which the content-related data (the URL information) is distributed. For example, it is found that the URL information is distributed to a total of five users through the user A who is the root distributor and that three of the five users purchase the content. It is also found that the URL information is distributed to two users through the user C and that each of the two users purchases the content.

The route information may be provided to the content provider (ZZ RECORDS in the aforementioned example), for example. The content provider may positively evaluate, for example, a user who distributes the URL information to more users (the users A and C in the example in FIG. 7) and thus designate the user as a root distributor in releasing a new content.

In addition, when a certain user purchases content, the content provider may positively evaluate another user who distributes the URL information to the certain user. In this case, in the example in FIG. 7, the user A distributing the URL information to the user B purchasing the content and the user C distributing the URL information to the users F and G may be positively evaluated.

Further, the content provider may positively evaluate a user who originates distribution of the URL information leading to secondary distribution. In this case, in the example in FIG. 7, the user A is positively evaluated because the URL information distributed to the user B is further distributed to the user C. The user B is also positively evaluated because the URL information distributed to the user C is further distributed to the users F and G. Such evaluations may show that, for example, a certain user has a friend in such a close relationship that leads to further recommendation of the certain users recommendation to another user.

As a matter of course, the evaluations as described above may be executed by the server device 100. For example, the server device 100 may generate evaluation result information indicating a positive evaluation of; a user who distributes the content-related data to more users; a user who performs distribution leading to purchase of content; or a user who originates distribution of the URL information leading to secondary distribution, and may provide the content provider with the evaluation result information.

(1-6. Modification)

Figure 8:
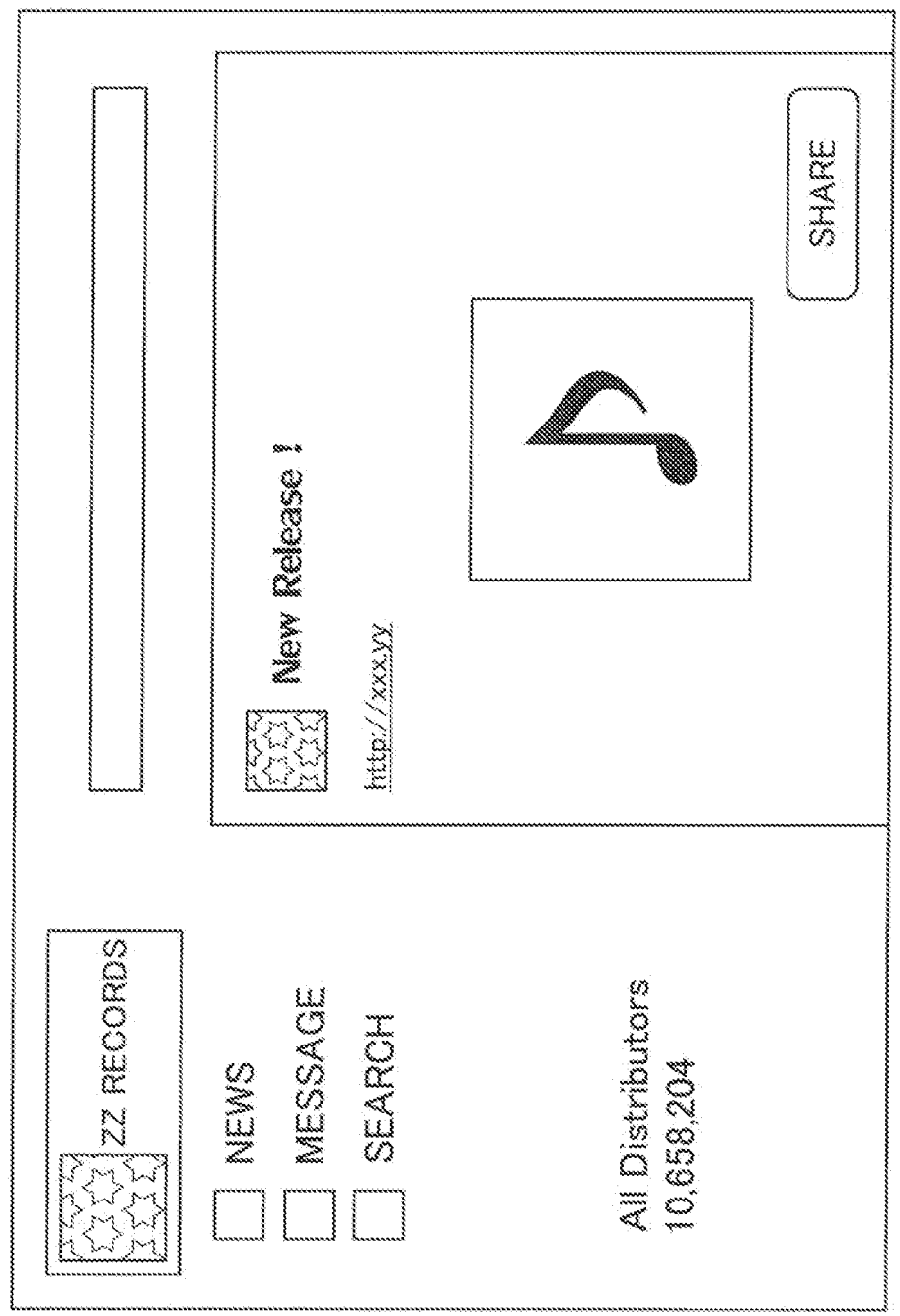
FIG. 8 is a diagram illustrating a modification of the first embodiment of the present disclosure.

FIG. 8 illustrates, as a modification of the present embodiment, an example of a user interface (a screen) in the case where the content provider himself/herself is a root distributor. This screen may be displayed to, for example, each user visiting a fan page established by the content provider (ZZ RECORDS) in the social network service. A message from ZZ RECORDS indicating release of a new tune is displayed on the screen. The message includes the URL information (http://xxx.yy) for accessing a shopping page for purchasing the tune (a content entity).

A user viewing the screen can share the URL information with a friend of the user by pressing the "SHARE" button. Thereby, the user becomes a distributor of the URL information. The number of users becoming the distributors in this way may be displayed on the screen.

In the present modification, when the route information as shown in FIGS. 6 and 7 is generated, the root distributor is the content provider (ZZ RECORDS). The user becoming the distributor by viewing the page as in the example in FIG. 8 can be said to be a primary distributor to whom the root distributor directly distributes the content-related data. For example, when secondary distribution of the content-related data occurs from such a primary distributor to another user, the content provider or the server device 100 may positively evaluate the primary distributor to assign the user points for a discount or the like to be given in purchasing content.

(2. Second Embodiment)

Subsequently, a description is given of a second embodiment of the present disclosure. The present embodiment different from the first embodiment described above in a point that content-related data is a content entity. Note that the other points are the same as those in the first embodiment, and thus a detailed description thereof is omitted.

(2-1. Content-Related Data Distribution Example)

Figure 9:
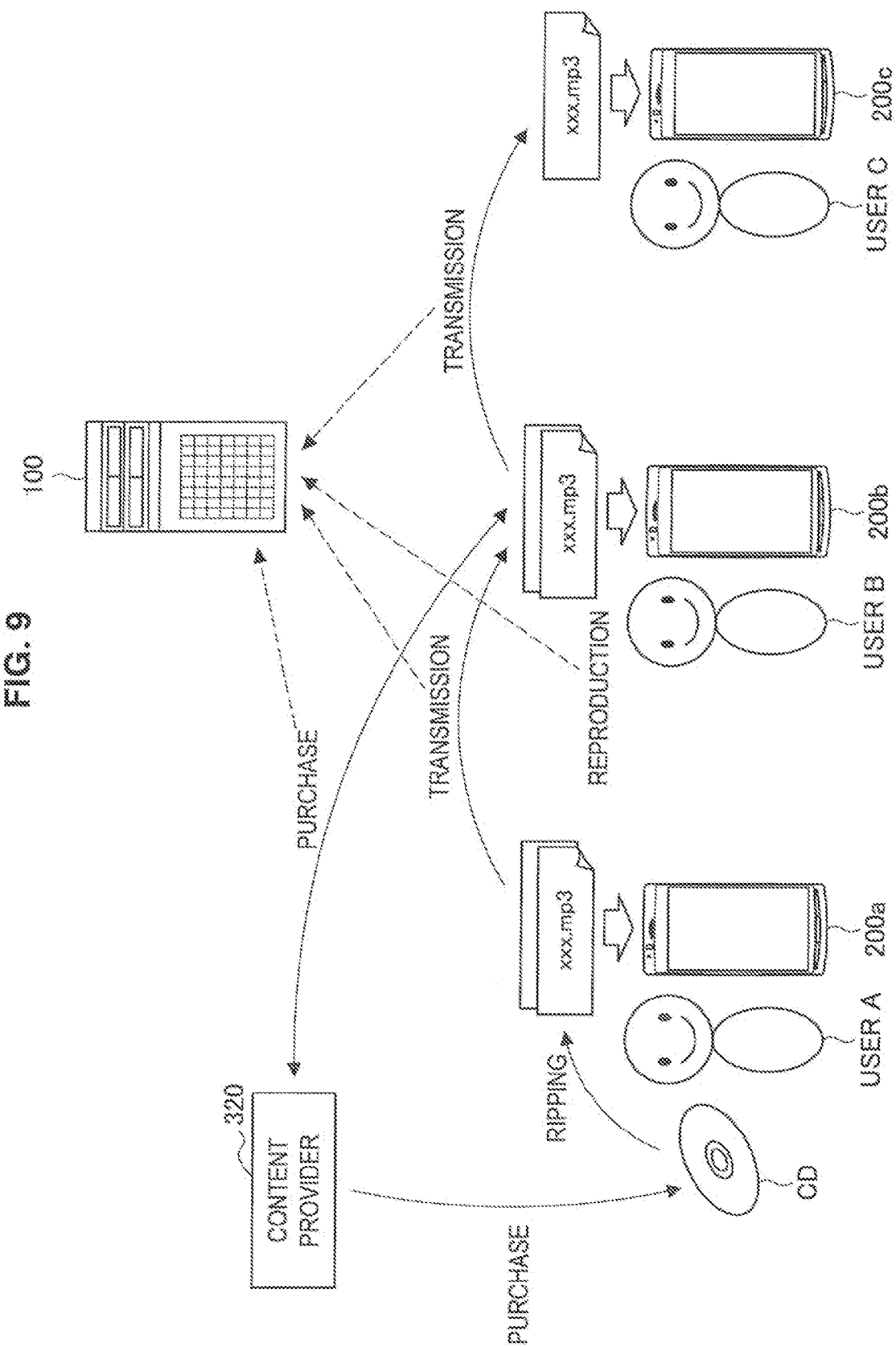
FIG. 9 is a diagram illustrating an example of distribution of content-related data in a second embodiment of the present disclosure.

FIG. 9 illustrates an example of distribution of content-related data in the present embodiment. In the present embodiment, the content-related data is, for example, a sound file (xxx.mp3) of a tune obtained by ripping a CD (Compact Disc) by the user A, that is, a content entity.

In the illustrated example, the user A purchases a CD from a content provider 320 and rips the CD to generate a sound file (xxx.mp3) of a tune. For example, in the case where the user A purchases the CD at a brick-and-mortar shop, it is not found at the time point of the purchase of the CD that the user A obtains the sound file. However, for example, if the user A rips the CD by using application software to generate a sound file or reproduces the sound file, it can be found that the user A obtains the sound file.

Next, the user A transmits a copy of the sound file through the network 400 the sound file to the user B who is a friend of the user A (the user B does not necessarily have to be a friend). The transmission may be executed, for example, by uploading the sound file to an online storage on the network 400 or by attaching the sound file to a message such as e-mail. Such an online storage or a message may be provided, for example, as a social network service.

The user B receiving the sound file transmits a copy of the sound file to the user C in the same way. In this way, the sound file (xxx.mp3) which is the content-related data is distributed from the user A to the user B, and further from the user B to the user C. Here, the user B has already reproduced the received sound file.

Note that the copying and the transmitting of the sound file as in the aforementioned example might infringe the copyright of the tune which is the content, unless the copying and the transmitting falls under so-called private use. Hence, the user B purchases, from the content provider 320, the content of the sound file transmitted from the user A. The user C can also purchase the content in the same way. Purchasing content herein may be, for example, obtaining a license of the content corresponding to the sound file, or may be obtaining a legitimate sound file of the corresponding content and then using the sound file instead of the originally distributed sound file.

(2-2. Acquired Information Example)

With reference to FIG. 9, a description is continuously given of the information acquired by the server device 100 with respect to the content-related data in the present embodiment. From application software used by users to access sound files, the server device 100 acquires distribution information indicating that the content-related data (the sound file) is distributed.

In the illustrated example, the application software used by each user to reproduce and transmit a sound file has a function of providing the server device 100 with the distribution information. For example, in the case where a sound file is attached to a message transmitted by the user A to the user B, the application software used for transmitting and receiving the message provides the server device 100 with distribution information indicating that the sound file is distributed from the user A to the user B.

In the present embodiment, the server device 100 may also acquire access information indicating that a user accesses content-related data (a sound file). Note that the access to the sound file means reproduction of the sound file. In the illustrated example, from the application software used by the user B to reproduce the sound file, the server device 100 acquires information indicating that the user B accesses the sound file.

Further, also in the present embodiment as in the first embodiment described above, the server device 100 may acquire license information indicating that a license of content (tune) corresponding to content-related data (a sound file) is purchased. In the illustrated example, the server device 100 acquires information indicating that the user B purchases a license from the content provider 320.

Also in the present embodiment, the route information indicating a route through which the content-related data (the sound file) is distributed among the users belonging to the network 400 is generated based on the information acquired by the server device 100 in this way.

(2-3. Route Information Example)

FIG. 10 illustrates an example of route information generated in the present embodiment. For example, in the aforementioned example, when the distribution information indicating that the sound file is distributed from the user A to the user B is acquired, a record REC_12 is added to the route information. The record REC_12 has fields for identifying a user name (the user B) and a distribution source (the user A).

Further, a reproduction state flag indicating whether or not the user B reproduces the sound file (that is, accesses the sound file) and the purchase state flag indicating whether or not the user B purchases the content (the tune) may be added to the record REC_12. When the distribution information is acquired to generate the record REC_12, the reproduction state flag and the purchase state flag are each set to "NO", which indicate that the user B has neither reproduced the sound file nor purchased the content.

Thereafter, when the information indicating that the user B reproduces the sound file is acquired as access information, the reproduction state flag of the record REC_12 associated with the user B is updated to "YES", that is, the flag indicating that the user B reproduces the sound file. In addition, when the information indicating that the user B purchases the content is acquired as the license information, the purchase state flag of the record REC_12 is updated to "YES", that is, the flag indicating that the user B purchases the content.

Likewise, when the distribution information indicating that the sound file is distributed from the user B to the user C is acquired, the record REC_13 is added to the route information. The record REC_13 identifies the user C and the user B as the user name and the distribution source, respectively. In addition, the reproduction state flag and the purchase state flag of the record REC_13 are each set to "NO".

Further, in the present embodiment, the record REC_11 may also be added to the route information for the user A who is the root distributor on the network 400. The field of the distribution source is not set in the record REC_11. The record REC_11 is used, for example, for holding the reproduction state flag and the purchase state flag for the user A. The reproduction state flag for the user A may be acquired from the application software used by the user A to reproduce the sound file in the same way as for a user who is a distribution destination. For example, application software used by the user A for ripping a CD determines whether or not the CD is legitimate. When the CD is legitimate, the purchase state flag for the user A may be set to "YES".

Figure 11:
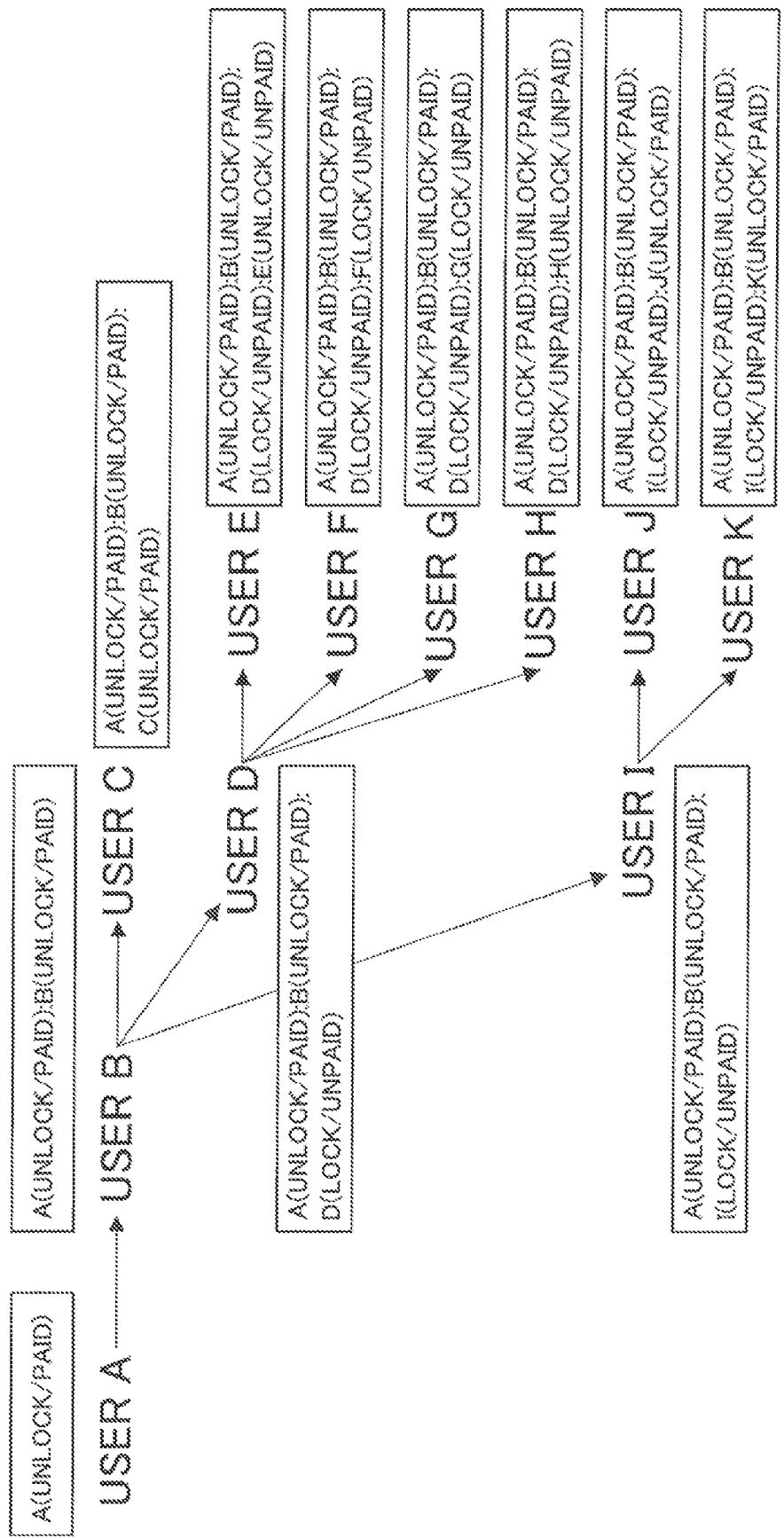
FIG. 11 is a diagram illustrating an example of visually expressing the route information illustrated in FIG. 10.

FIG. 11 illustrates the route information as shown in FIG. 10 which is visually expressed in a tree structure. FIG. 11 shows that the reproduction state flag included in the route information is expressed by using "LOCK" or "UNLOCK". "LOCK" means a state in which a user has not been reproduced the obtained sound file, while "UNLOCK" means a state in which the user has reproduced the obtained sound file. In addition, the purchase state flag included in the route information is expressed by using "UNPAID" or "PAID". "UNPAID" means a state in which the user has not purchased content corresponding to the obtained sound file, while "PAID" means a state in which the user has purchased the content corresponding to the obtained sound file.

Note that for convenience of explanation, some of distribution states of the sound file in the example in FIG. 11 are different from those in the example in FIG. 10. In addition, FIG. 11 illustrates distribution of the sound file to the user D and further to a user K which is not illustrated in FIG. 10.

Such route information makes it possible to easily find a route through which the content-related data (the URL information) is distributed, a reproduction state of each user on the route, and a purchase state thereof. For example, it is found that the sound file is distributed to a total of ten users through the user A who is the root distributor and that four of the ten users purchase the content. It is also found that the sound file is distributed to four users through the user D and that any of the users does not purchase the content.

In the illustrated route information, the route information is displayed for each sound file held in the terminal devices 200 by the respective users. For example, the route information displayed for the sound file held by the user K is "A (UNLOCK/PAID):B(UNLOCK/PAID):I (LOCK/UNPAID):K (UNLOCK/PAID)". From this information, the following is found, for example:

the sound file is distributed from the user A to the user K through the user B and a user I;

among the users on the distribution route, the user A, the user B, and the user reproduce the sound file; and among the users on the distribution route, the user A, the user B, and the user K purchase the content.

In an alternative configuration, such route information on a sound file basis may be included in the sound file itself. For example, if a CD ripped by the user A is legitimate, the sound file is provided with the route information of "A (LOCK/PAID)" at the time of the ripping. When the user A reproduces the sound file, the route information is updated to "A (UNLOCK/PAID)". Further, when the sound file copied by the user A is transmitted to the user B, the route information provided to the transmitted sound file is updated to "A (UNLOCK/PAID) B (LOCK/UNPAID)". Subsequently, the sound file provided with the route information as described above can also be distributed in the same way.

In this case, by reading the route information of the sound file held by each user, the server device 100 may acquire the distribution information of the sound file. One of advantages of such a configuration is that even when a sound file is distributed among users by using removable recording media or the like without the network 400, the distribution of the sound file can be found as long as each of the users belongs to the network 400.

(2-4. Route Information Utilization Example)

The route information as described above may be used by the content provider or the like as in the first embodiment. Hereinbelow, a description is given of an example of more advanced use of the route information in the present embodiment.

Figure 12:
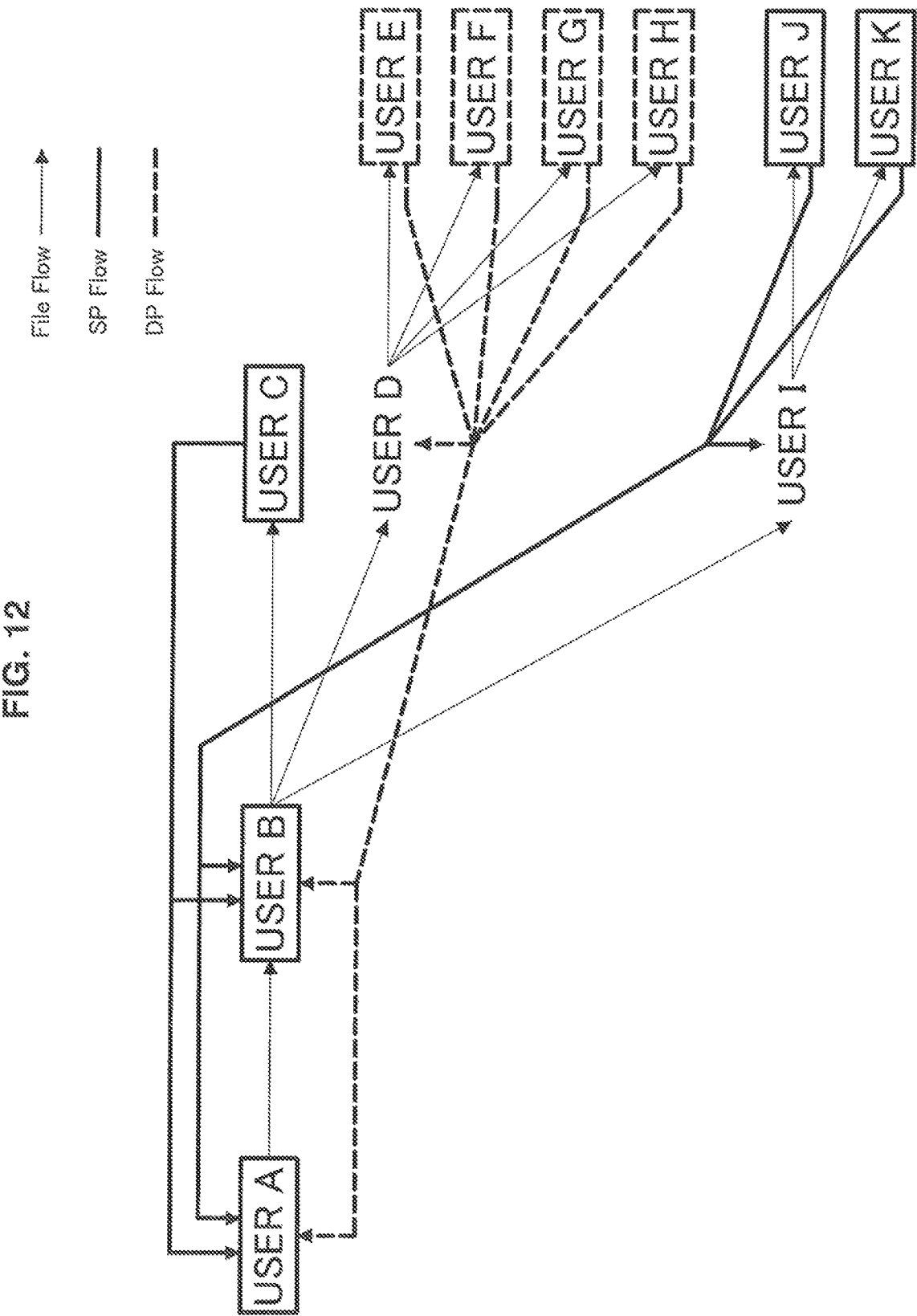
FIG. 12 is a diagram illustrating an example of evaluations of users in the second embodiment of the present disclosure.

FIG. 12 illustrates an example of numerically evaluating each user on a distribution route based on the reproduction state and the purchase state of the user in the route information. Distribution of content-related data (a sound file) among the users and the reproduction and purchase states of each user in the illustrated example are the same as those in the aforementioned example in FIG. 11. A distribution flow of the sound file is shown by the arrows in the same way as in FIG. 11.

Further, FIG. 12 illustrates a flow of SPs (Subscribed Points) which are points and indicate a positive evaluation. The points are assigned to a user distributing a sound file to a user purchasing the corresponding content. These are referred to as SPs in the present embodiment, but this name is not used in a limited meaning. Generation of SPs is performed in accordance with the number of users who purchase the content, and SPs may be assigned to the users on distribution routes.

For example, SPs generated for the user C who purchases the content may be assigned to the user C himself/herself and the users A and B who are the users on the same distribution route. Which user, the user B who directly distributes the sound file to the user C or the user A who is an upstream distributor, is assigned more SPs, or whether the users A and B are not assigned the same SPs may set appropriately by the content provider or the like.

Meanwhile, FIG. 12 also illustrates a flow of DPs (Debit Points) which are points and indicate a negative evaluation. The points are assigned to a user distributing the sound file to a user (hereinafter, an unentitled user) who reproduces the sound file but does not purchase the corresponding content. In the present embodiment, these are regarded as a debit of a copyright holder and thus referred to as DPs, but this name is not used in a limited meaning. Points having a name in a different meaning and corresponding to DPs may be set. Generation of DPs is performed in accordance with the number of unentitled users, and DPs may be assigned to the users on distribution routes.

For example, DPs generated for the user E to a user H who are the unentitled users may be assigned to the user B to the user H themselves and the users A, B and D who are users on the same distribution route. How much DPs are assigned to the users on the distribution route depending on the users or whether no DP is assigned to a particular user may be set appropriately by the content provider or the like.

Here, the user D is a user who neither reproduces the sound file nor purchases the content and only distributes the sound file. Every one of the users E to H to whom the user D distributes the sound file is the unentitled user. Thus, the user D may be regarded as a "malignant distributor" to be assigned more DPs, for example.

In contrast, the user I is also the user who only distributes the sound file, hut every one of a user J and the user K to whom the user I distributes the sound file purchases the content. Hence, the user I may be regarded as a "benign distributor" to be assigned more SPs, for example.

The aforementioned SPs and DPs are used, for example, by the content provider to evaluate each user. For example, a user having more DPs than SPs can be considered to be a user who distributes a sound file mainly to an unentitled user. For this reason, it is conceivable to take such an action as: prohibition of providing the user with a service such as a discount to be given in purchasing content; or restriction of access to a service such as downloading of a sound file.

On the other hand, a user having much more SPs than DPs can be considered to be a user who distributes the sound file to users highly likely to purchase content and who contributes to the copyright holder and the content provider. For this reason, it is conceivable, for example, that the user is rewarded for the contribution by being differentiated from other users having SPs almost equivalent to DPs by being provided with the service such as the discount to be given in purchasing content and that the distribution of the sound file is promoted in such a manner as to meet the benefit of the copyright holder and the content provider.

Figure 13:
FIG. 13 is a chart illustrating an example of showing one of the users subjected to the evaluations illustrated in FIG. 12 the evaluations of the other users.

FIG. 13 illustrates an example of display in the case where one of users on the distribution route can view points assigned to the other users. In the illustrated example, SPs and DPs of the users C, D and I are displayed to the user B in the example in FIG. 12.

For example, the user B shown such display may exclude the user D having considerably more DPs than SPs from transmission destinations of the sound file. This is because, if the user D continues to distribute the sound file transmitted from the user B to unentitled users in the future, the user B will be assigned more DPs.

In contrast, the user B may transmit the sound file preferentially to the user I having more SPs than DPs. This is because, if a user to whom the user I distributes a new sound file transmitted from the user B purchases a corresponding content, the user B is assigned more SPs.

As described above, the user evaluation method using SPs, DPs and the like is expected to also provide such an effect as so-called self-purification of the distribution route in which behaviors of a user himself/herself on the distribution route leads to exclusion of malignant distributors and favorable treatment of benign distributors.

(2-5. Modification)

The description has been heretofore given of the example in which a content entity (a sound file) is transferred in distribution of content-related data. However, the embodiment of the present disclosure is not limited to the example described above.

For example, the distribution of the content-related data may be performed by streaming delivery of the content entity. Here, when the content entity delivered by streaming is accumulated in a client device 200, it is possible to define the distribution of the content-related data in the same way as in the aforementioned example of transferring the sound file.

On the other hand, when the content entity delivered by streaming is not accumulated in the client device 200, link information for example linking a streaming source to a streaming destination may be acquired as the distribution information in the same way as in the aforementioned first embodiment.

In this case, when a streaming destination user purchases content, a streaming source user may be positively evaluated as in the aforementioned example of SPs. In addition, let us consider a case where the streaming destination user does not purchase the content. If the content reproduced by streaming is not paid for, the streaming source user may be negatively evaluated as a malignant distributor as in the aforementioned example of DPs.

(3. Device Configuration)

3-1. Functional Configuration)

Subsequently, a functional configuration of the server device 100 according to the aforementioned embodiments will be described with reference to FIG. 14.

Figure 14:
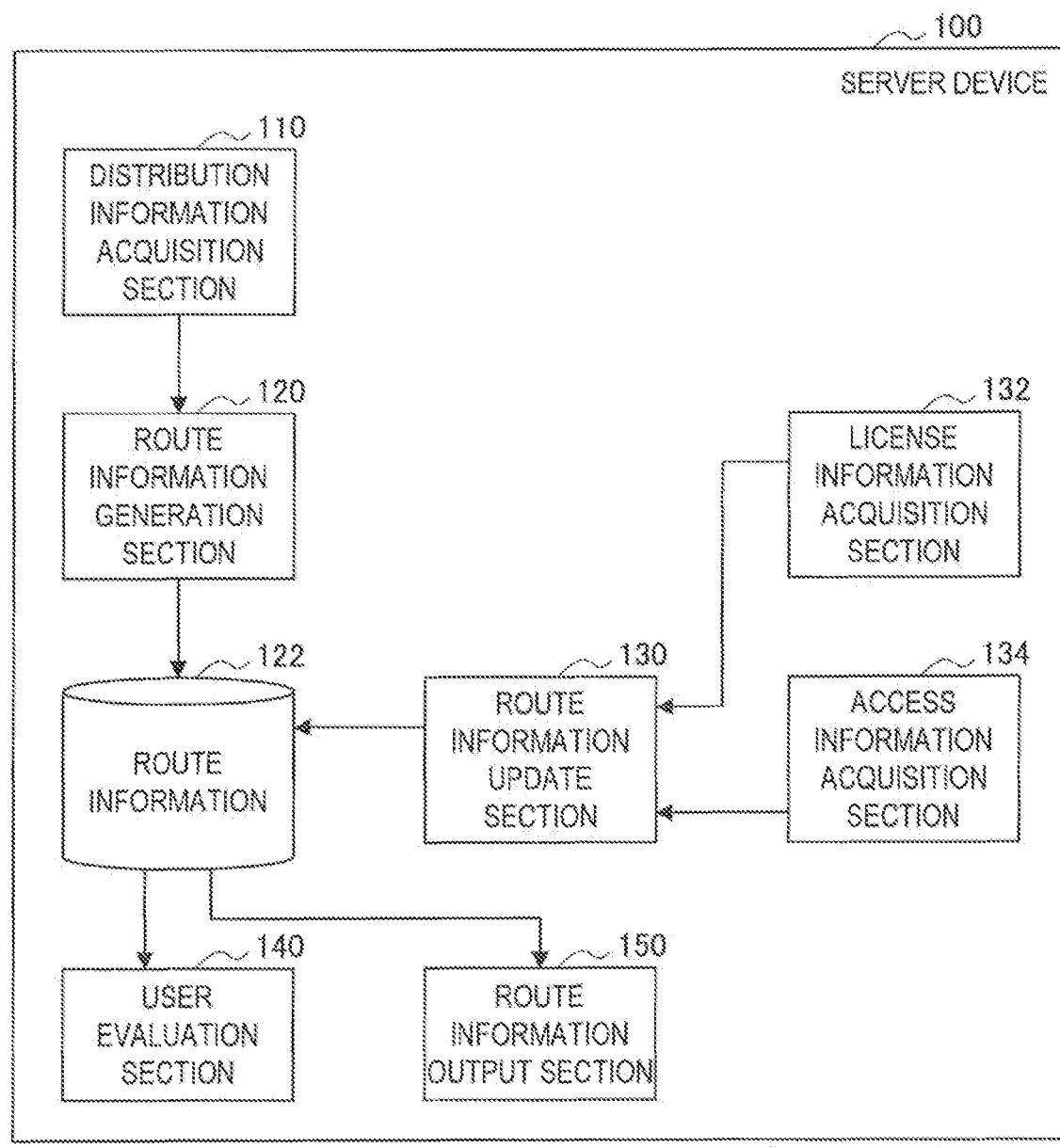
FIG. 14 is a block diagram illustrating a functional configuration of a server device according to the embodiments of the present disclosure.

With reference to FIG. 14, the server device 100 may include a distribution information acquisition section 110, a route information generation section 120, a mute information update section 130, a license information acquisition section 132, an access information acquisition section 134, a user evaluation section 140, and a route information output section 150.

Note that these functional components may be realized as software by using, for example, a CPU (Central Processing Unit), a RAM (Random Access Memory), a ROM (Read Only Memory) which will be described later, and the like. A program for causing the CPU to implement these functions and a recording medium in which the program is recorded may be embodiments of the present disclosure.

(Distribution Information Acquisition Section)

The distribution information acquisition section 110 acquires distribution information indicating that content-related data is distributed from a first user to a second user through the network 400 to which the first and second users belong.

Here, the content-related data may be any data related to content, such as a content entity, information on a link to the content entity, or information on a link to a site including the link to the content entity, as described in the aforementioned embodiments. The form of content is not limited to sound in the aforementioned examples of the embodiments, and may be any of various forms such as a moving image, an image, a sentence, and a program. In other words, content in the embodiments of the present disclosure can be said to be a concept widely including a creation whose copyright might be asserted.

In addition, as described in the aforementioned embodiments, the distribution of the content-related data corresponds to, for example: transmitting a file of a content entity (including upload to and download from a storage on a network, and the like); and viewing posted link information. Thereby, content-related data held by a certain user is also held by another user. In addition, as described in the aforementioned embodiments, also in the case where content-related data is delivered offline by using a removable recording medium or the like by, for example, incorporating distribution information in the content-related data itself, this can be found as the distribution of the content-related data.

Note that the content-related data does not necessarily have to be directly delivered from the first user to the second user. For example, one or more different users may exist between the first user and the second user. That is, the first user means a user on the upstream side in the distribution route, and the second user means a user on the downstream side in the distribution route. It is not necessarily meant that these users neighbor to each other on the distribution route.

In addition, as described above, the network 400 includes both a communication network such as the Internet and network services such as social network services provided on the communication network. That is, the "first and second users belonging to the network 400" may be, for example, two users associated with the respective terminal devices 200 connected to the same communication network, or may be two users using the same social network service.

(Route Information Generation Section)

Based on the distribution information acquired by the distribution information acquisition section 110, the route information generation section 120 generates route information 122 indicating a route through which the content-related data is distributed among the users belonging to the network 400.

Here, a specific data format of the route information 122 may be any format. For example, the route information 122 may be stored as information in a table structure as in the aforementioned examples in the embodiments or may be stored in any of other various data formats.

In addition, the route information 122 may be stored in a storage device or the like of the server device 100. The route information 122 may be included in the content-related data itself as described in the aforementioned embodiments. In the same way as in this case, the route information 122 may be held by each terminal device 200 of the corresponding user on the distribution route.

Note that the route information 122 does not necessarily have to indicate every route through which the content-related data is distributed among the users belonging to the network 400. In other words, with reference to the tree structures illustrated in the aforementioned embodiments, information in a sub-tree portion which does not necessarily include the root node may be held as the route information 122.

(Route Information Update Section)

Based on license information and access information to be described later, the route information update section 130 updates information on a license state and an access state which are associated with each user in the route information 122. Note that the route information 122 does not necessarily have to include the information on the license state or the access state. In other words, the server device 100 does not necessarily have to include the route information update section 130, the license information acquisition section 132, or the access information acquisition section 134. In addition, the server device 100 may include the route information update section 130 and either the license information acquisition section 132 or the access information acquisition section 134, and the route information 122 may include information on either the license state or the access state.

The license information acquisition section 132 acquires license information indicating that the second user who is a distribution destination of the content-related data obtains a license of content corresponding to the content-related data, the distribution destination being indicated by the route information 122.

Here, as described in the aforementioned embodiments, acquiring the license of the content corresponds to accessing a content providing site from, for example, the URL information which is the content-related data and thereby, purchasing the content. In addition, when the content-related data is a content entity, acquiring the license may correspond to purchasing a license for using the content entity. In such a case, the information on the license state included in the route information 122 can also be said to be information on a purchase state.

Note that acquiring a license does not necessarily have to mean purchasing the license involved with payment. For example, for such content that is distributed for the purpose of a promotion, a case is also conceivable in which a user obtains a license for using the content by registering for membership.

The access information acquisition section 134 acquires the access information indicating that the second user who is the distribution destination of the content-related data accesses the content-related data, the distribution destination being indicated by the route information 122.

Here, as described in the aforementioned embodiments, accessing the content-related data could be, for example, accessing the content entity which is the content-related data and thereby reproducing the content. In this case, the information on the access state included in the route information 122 may be information indicating that a user utilizes the content in any manner, that is, benefits from the content.

In addition, in such a case that the content-related data is the URL information for accessing the content providing site, accessing the content providing site may be interpreted as accessing the content-related data. In this case, the information on the access state included in the route information 122 may be information indicating that a user takes some sort of action by using the provided content-related data.

(User Evaluation Section)

The user evaluation section 140 evaluates the users belonging to the network 400 based on the route information 122. When the route information 122 includes the information on the license state or the access state, the user evaluation section 140 may evaluate the users by using the information. Note that the server device 100 does not necessarily have to include the user evaluation section 140. In this case, the route information 122 is visually outputted by, for example, the route information output section 150 or is provided to the content provider or the like still in a data state in which the route information 122 is stored.

For example, when the route information 122 indicates that the content-related data is distributed from the first user to the second user and further from the second user to a third user, the user evaluation section 140 may positively evaluate the first user as a user causing secondary distribution. That is, in this case, the first user who causes the content-related data to be distributed up to the third user is more highly evaluated than another first user who causes the content-related data to be distributed to only a second user.

In addition, for example, the user evaluation section 140 may evaluate each first user according to the number of second users to whom the first user distributes the content-related data. In this case, unlike the aforementioned secondary distribution case, a user who distributes the content-related data to more users is more highly evaluated in a simple way. The second user herein may include not only a user to whom the content-related data is directly distributed from the first user but also a user to whom the content-related data is indirectly distributed through one or more users existing therebetween.

In addition, for example, the user evaluation section 140 may evaluate the users belonging to the network 400 on a per group basis, the group including a first user and a second user involved with the distribution of the content-related data. This may be, for example, evaluating the users on a per sub-tree basis, the sub-tree originating from any one of nodes (users) in the tree structure shown by the route information 122. For example, SPs and DPs in the aforementioned second embodiment can be said to be an example of an method of evaluating a group including a favorable user or a malignant user located downstream in the distribution route and a user located upstream in the distribution route who causes the content-related data to be distributed to the favorable user or the malignant user.

Further, let us consider a case where, for example, the user evaluation section 140 evaluates users based on the license state included in the route information 122. When a second user to whom a first user distributes the content-related data obtains a license, for example, by purchasing content, the user evaluation section 140 may positively evaluate the first user as a user who induces the obtaining of the license. That is, in this case, the first user distributing the content to the second user who obtains the license of the content is more highly evaluated than another first user distributing the content to a second user who does not obtain the license.

In addition, let us consider a case where, for example, the user evaluation section 140 evaluates users based on the license state and the access state included in the route information 122. When a first user distributes content to a second user but the second user accesses content-related data without obtaining a license of the content, the user evaluation section 140 may negatively evaluate the first user as a user who induces the unauthorized use of the content. Such a configuration is effective in a case where content-related data is, for example, a content entity such as a sound file and a second user benefits from content by accessing the content-related data.

In addition, let us consider a case where, for example, the user evaluation section 140 evaluates users based on the access state included in the route information 122. When a second user to whom a first user distributes content accesses content-related data, the user evaluation section 140 may positively evaluate the first user as a user who induces the access to the content-related data. Such a configuration is effective in the case where content-related data is, for example. URL information for accessing a content providing site and accessing the content providing site is one of purposes of distribution of the content-related data. In addition, also in the case where content-related data is, for example, a content entity, the configuration described above is effective as long as content is provided, for example, for a promotion and reproducing the content by users without obtaining a license answers the purpose of the content provider.

(Route Information Output Section)

The route information output section 150 outputs the route information 122 as visual information. Note that the server device 100 does not necessarily have to include the route information output section 150. In this case, the route information 122 is outputted as, for example, a result of evaluation by the user evaluation section 140 or is provided to the content provider content provider or the like still in the data state in which the route information 122 is stored.

Here, output of the route information 122 by the route information output section 150 may be, for example, information indicating the tree structure as described in the aforementioned embodiments. In addition, the output of the route information 122 is not limited to this example. The route information output section 150 may output the route information 122 in any of various formats such as a table format and a graph format.

(3-2. Hardware Configuration)

Subsequently, a hardware configuration of the information processing apparatus will be described with reference to FIG. 15, the hardware configuration making it possible to realize the server device and the client device according to the embodiments of the present disclosure.

Figure 15:
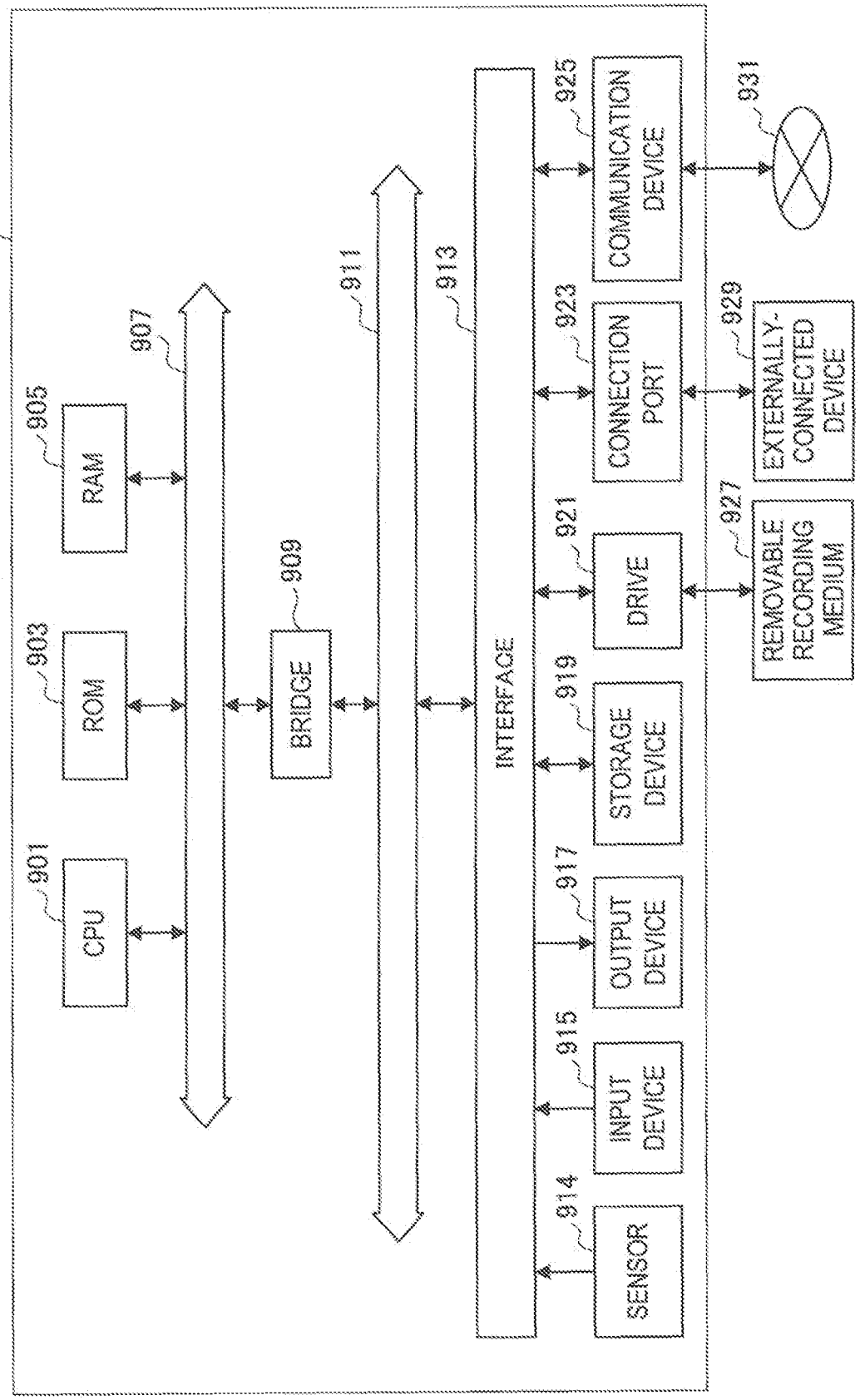
FIG. 15 is a block diagram illustrating a hardware configuration of an information processing apparatus according to the embodiments of the present disclosure.

With reference to FIG. 15, an information processing apparatus 900 includes a CPU (Central Processing Unit) 901, a ROM (Read Only Memory) 903, and a RAM (Random Access Memory) 905. Further, the information processing apparatus 900 may as appropriate include a host bus 907, a bridge 909, an external bus 911, an interface 913, an input device 915, an output device 917, a storage device 919, a drive 921, a connection port 923, and a communication device 925. The information processing apparatus 900 may have a processing circuit such as a DSP (Digital Signal Processor) instead of or together with the CPU 901.

The CPU 901 functions as an arithmetic processing unit and a controller device and controls the entirety or part of an operation of the information processing apparatus 900 according to various programs recorded in the ROM 903, the RAM 905, the storage device 919, or a removable recording medium 927. The ROM 903 stores programs, operational parameters, and the like which are used by the CPU 901. The RAM 905 primarily stores the programs used and executed by the CPU 901, parameters appropriately varying in executing the programs, and the like. The CPU 901, the ROM 903, and the RAM 905 are connected to each other by the host bus 907 configured by an internal bus such as a CPU bus. Further, the host bus 907 is connected to the external bus 911 such as a PCI (Peripheral Component Interconnect/Interface) bus via the bridge 909.

The input device 915 is a device operated by a user, such as a mouse, a keyboard, a touch panel, a button, a switch, or a handle. The input device 915 may be, for example, a remote control device utilizing infrared rays or other radio waves, or may be an externally-connected device 929 such as a mobile phone working in accordance with manipulation of the information processing apparatus 900. The input device 915 includes an input control circuit which generates an input signal based on information inputted by the user and which outputs the signal to the CPU 901. The user manipulates the input device 915 to thereby input various pieces of data to the information processing apparatus 900 and to instruct the information processing apparatus 900 for a processing operation.

The output device 917 is formed by a device capable of notifying the user of acquired information visually or audibly. The output device 917 may be: a display device such as an LCD (Liquid Crystal Display), a PDP (Plasma Display Panel), or an organic EL (Electro-Luminescence) display; an audio output device such as a speaker or a headset; a printer device; or the like. The output device 917 outputs a 21) result obtained by the processing performed by the information processing apparatus 900, as video such as text or an image, or as audio such as voice or sound.

The storage device 919 is a device for storing data and is configured as an example of a storage section of the information processing apparatus 900. The storage device 919 is formed by a magnetic storage device such as a HDD (Hard Disk Drive), a semiconductor storage device, an optical storage device, a magneto-optical storage device, or the like. This storage device 919 stores programs to be executed by the CPU 901, various pieces of data, various pieces of data acquired from an external device, and the like.

The drive 921 is a reader/writer for the removable recording medium 927 such as a magnetic disk, an optical disk, a magneto-optical disk, or a semiconductor memory, and is built in or externally connected to the information processing apparatus 900. The drive 921 reads information recorded in the removable recording medium 927 loaded in the drive 921 and outputs the information to the RAM 905. The drive 921 also writes information to the loaded removable recording medium 927.

The connection port 923 is a port for directly connecting a device to the information processing apparatus 900. The connection port 923 may be a USB (Universal Serial Bus) port, an IEEE1394 port, a SCSI (Small Computer System Interface) port, or the like. The connection port 923 may also be an RS-232C port, an optical audio terminal, a HDMI (High-Definition Multimedia In(erface) port, or the like. By connecting the externally-connected device 929 to the connection port 923, various pieces of data may be exchanged between the information processing apparatus 900 and the externally-connected device 929.

The communication device 925 is a communication interface configured by a communication device and the like for connecting a communication network 931. The communication device 925 may be a communication card or the like for wired or wireless LAN (Local Area Network), Bluetooth (registered trademark), or WUSB (Wireless USB). The communication device 925 may also be a router for optical communication, a router for ADSL (Asymmetric Digital Subscriber Line), a modem for various communications, or the like. The communication device 925 transmits and receives signals and the like between, for example, the Internet and another communication device by using a predetermined protocol such as TCP/IP. In addition, the communication network 931 connected to the communication device 925 is a network connected in a wired or wireless manner, and is: the Internet; a borne LAN; a network for infrared communication, radio wave communication, or satellite communication; or the like.

There has heretofore been shown an example of the hardware configuration of the information processing apparatus 900. The aforementioned components may be configured by using general-purpose members or may be configured by using hardware provided for specific functions of the respective components. Such a configuration may be appropriately changed according to a technical level at the time of implementing the configuration.

(4. Supplement)

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus including:

a distribution information acquisition section which acquires distribution information indicating that content-related data is distributed from a first user to a second user through a social network to which the first user and the second user belong; and a route information generation section which generates route information based on the distribution information, the route information indicating a route through which the content-related data is distributed among users belonging to the social network.

(2) The information processing apparatus according to (1), further including:

a license information acquisition section which acquires license information indicating that the second user obtains a license of content corresponding to the content-related data; and a route information update section which updates a license state based on the license information, the license state being associated with the second user in the route information.

(3) The information processing apparatus according to (2), further including a user evaluation section which evaluates the users belonging to the social network based on the license state.

(4) The information processing apparatus according to (3),
wherein when the second user obtains the license of the content, the user evaluation section positively evaluates the first user.

(5) The information processing apparatus according to (3) or (4), further including
an access information acquisition section which acquires access information indicating that the second user accesses the content-related data,
wherein the route information update section updates an access state based on the access information, the access state being associated with the second user in the route information, and
wherein when the second user accesses the content-related data without obtaining the license of the content, the user evaluation section negatively evaluates the first user.

(6) The information processing apparatus according to (1), further including:
an access information acquisition section which acquires access information indicating that the second user accesses the content-related data; and
a route information update section which updates an access state based on the access information, the access state being associated with the second user in the route information.

(7) The information processing apparatus according to (6), further including
a user evaluation section which evaluates the users belonging to the social network based on the access state.

(8) The information processing apparatus according to (7),
wherein when the second user accesses the content-related data, the user evaluation section positively evaluates the first user.

(9) The information processing apparatus according to any one of (1) to (8), further including
a user evaluation section which evaluates the users belonging to the social network based on the route information.

(10) The information processing apparatus according to (9),
wherein when the content-related data is distributed from the second user to a third user, the user evaluation section positively evaluates the first user.

(11) The information processing apparatus according to (9) or (10),
wherein the user evaluation section evaluates the first user according to the number of the second users to which the content-related data is distributed from the first user.

(12) The information processing apparatus according to any one of (9) to (11),
wherein the user evaluation section evaluates the users belonging to the social network on a per group basis, the group including the first user and the second user.

(13) The information processing apparatus according to any one of (1) to (12),
wherein the distribution information acquisition section acquires the distribution information from an activity in the social network.

(14) The information processing apparatus according to any one of (1) to (13),
wherein the distribution information acquisition section acquires the distribution information from application software used by the second user to access the content-related data.

(15) The information processing apparatus according to any one of (1) to (14),
wherein the distribution information acquisition section acquires distribution information included in the content-related data.

(16) The information processing apparatus according to any one of (1) to (15),
wherein the route information generation section generates the route information including a root distributor of the content-related data.

(17) The information processing apparatus according to any one of (1) to (16), further including
a route information output section which outputs the route information as visual information.

(18) An information processing system which provides a social network to which a first user and a second user belong, the information processing system including:
a terminal device which acquires content-related data associated with the second user and distributed from the first user; and
a server device including
a distribution information acquisition section which acquires distribution information through the social network, the distribution information indicating that the terminal device acquires the content-related data, and
a route information generation section which generates route information based on the distribution information, the route information indicating a route through which the content-related data is distributed among users belonging to the social network.

(19) A program for causing a computer to implement:
a function of acquiring distribution information through a social network to which a first user and a second user belong, the distribution information indicating that content-related data is distributed from the first user to the second user; and
a function of generating route information based on the distribution information, the route information indicating a route through which the content-related data is distributed among users belonging to the social network.

The present disclosure contains subject matter related to that disclosed in Japanese Priority Patent Application JP 2012-073429 filed in the Japan Patent Office on Mar. 28, 2012, the entire content of which is hereby incorporated by reference.

What is claimed is:
1. An information processing apparatus comprising:
circuitry configured to
acquire distribution information indicating that content-related data is distributed from a first user to a second user through a social network to which the first user and the second user belong,
generate route information based on the distribution information, the route information indicating a route through which the content-related data is distributed among users belonging to the social network,
acquire license information indicating that the second user obtains a license of content corresponding to the content-related data,
update a license state based on the license information, the license state being associated with the second user in the route information, and
evaluate the users belonging to the social network based on the license state,
wherein when the second user obtains the license of the content, the circuitry is further configured to positively evaluate the first user.

2. The information processing apparatus according to claim 1, wherein the circuitry is further configured to:
   acquire access information indicating that the second user accesses the content-related data; and
   update an access state based on the access information, the access state being associated with the second user in the route information,
   wherein when the second user accesses the content-related data without obtaining the license of the content, the circuitry is further configured to negatively evaluate the first user.

3. The information processing apparatus according to claim 1, wherein the circuitry is further configured to:
   acquire access information indicating that the second user accesses the content-related data; and
   update an access state based on the access information, the access state being associated with the second user in the route information.

4. The information processing apparatus according to claim 3, wherein the circuitry is further configured to:
   evaluate the users belonging to the social network based on the access state.

5. The information processing apparatus according to claim 4,
   wherein when the second user accesses the content-related data, the circuitry is further configured to positively evaluate the first user.

6. The information processing apparatus according to claim 1, wherein the circuitry is further configured to:
   evaluate the users belonging to the social network based on the route information.

7. The information processing apparatus according to claim 6,
   wherein when the content-related data is distributed from the second user to a third user, the circuitry is further configured to positively evaluate the first user.

8. The information processing apparatus according to claim 6,
   wherein the circuitry is further configured to evaluate the first user according to the number of the second users to which the content-related data is distributed from the first user.

9. The information processing apparatus according to claim 6,
   wherein the circuitry is further configured to evaluate the users belonging to the social network on a per group basis, the group including the first user and the second user.

10. The information processing apparatus according to claim 1,
    wherein the circuitry is configured to acquire the distribution information from an activity in the social network.

11. The information processing apparatus according to claim 1,
    wherein the circuitry is further configured to acquire the distribution information from application software used by the second user to access the content-related data.

12. The information processing apparatus according to claim 1,
    wherein the circuitry is further configured to acquire distribution information included in the content-related data.

13. The information processing apparatus according to claim 1,
    wherein the circuitry is further configured to generate the route information including a root distributor of the content-related data.

14. The information processing apparatus according to claim 1,
    wherein, the circuitry is further configured to output the route information as visual information.

15. An information processing system which provides a social network to which a first user and a second user belong, the information processing system comprising:
    a terminal device having circuitry which acquires content-related data associated with the second user and distributed from the first user; and
    a server device including
       circuitry configured to
          acquire distribution information through the social network, the distribution information indicating that the terminal device acquires the content-related data,
          generate route information based on the distribution information, the route information indicating a route through which the content-related data is distributed among users belonging to the social network,
          acquire license information indicating that the second user obtains a license of content corresponding to the content-related data,
          update a license state based on the license information, the license state being associated with the second user in the route information, and
          evaluate the users belonging to the social network based on the license state,
       wherein when the second user obtains the license of the content, the circuitry is further configured to positively evaluate the first user.

16. A non-transitory, computer-readable medium storing a program that, when executed by a processor of a computer having circuitry, causes the processor to execute a method for processing information, the method comprising:
    acquiring distribution information through a social network to which a first user and a second user belong, the distribution information indicating that content-related data is distributed from the first user to the second user;
    generating route information based on the distribution information, the route information indicating a route through which the content-related data is distributed among users belonging to the social network;
    acquiring license information indicating that the second user obtains a license of content corresponding to the content-related data;
    updating a license state based on the license information, the license state being associated with the second user in the route information, and
    evaluating the users belonging to the social network based on the license state,
    wherein when the second user obtains the license of the content, the first user is positively evaluated.

* * * * *